G. DES TROIS MAISONS.
HAY AND STRAW TAG.
APPLICATION FILED APR. 1, 1921.

1,419,161.

Patented June 13, 1922.

Inventor
Gustave des Trois Maisons
By
Attorney

UNITED STATES PATENT OFFICE.

GUSTAVES DES TROIS MAISONS, OF MONTREAL, QUEBEC, CANADA.

HAY AND STRAW TAG.

1,419,161. Specification of Letters Patent. Patented June 13, 1922.

Application filed April 1, 1921. Serial No. 457,802.

*To all whom it may concern:*

Be it known that I, GUSTAVE DES TROIS MAISONS, a British subject, residing at 231 Christophe Colomb, in the city of Montreal, in the Province of Quebec, in the Dominion of Canada, have invented certain new and useful Improvements in a Hay and Straw Tag; and I do hereby declare that the following is a full, clear, and exact description of the same.

The present invention relates to improvements in hay and straw tags and the main object of this invention is to provide means to indicate the various qualities of hay or straw bales; to indicate the name of the presser who pressed the bale; to indicate the grade, and the weight; the Province where it comes from, the quality as well as the date and month in which the bale was pressed.

Another object of this invention is to provide the consumer with means to find out from where the bale of hay or straw comes from; who was the presser; and the name of the farmer, so that if the grade, quality or weight indicated on the tag is incorrect the culprit can easily be found.

To better understand the present invention reference should be had to the accompanying drawings in which.

Like numerals of reference indicate corresponding parts in each figure.

Figure 1:
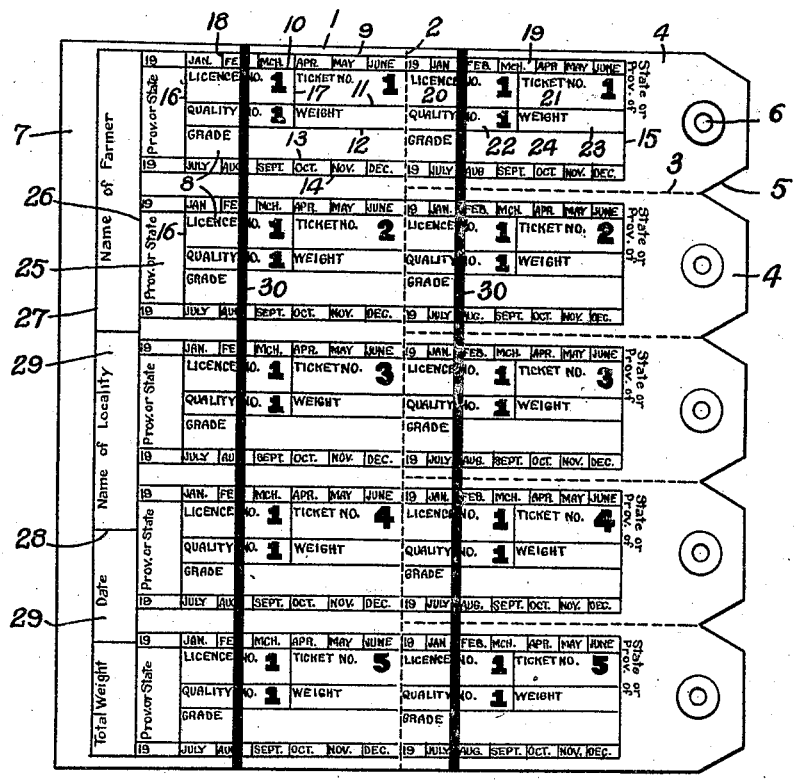
Figure 1 is a plan view of a series of tags with stubs.
Figure 2:
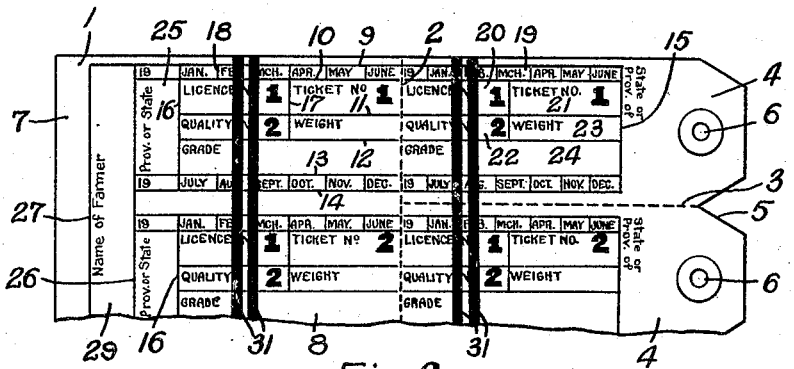
Figure 2 is a plan view of a series of tags with stubs and means to indicate the quality.

In the drawings; 1 indicates a rectangular sheet or card provided with a central perforated line 2 which extends from the top to the bottom of said card and 3 are a plurality of perforated lines extending laterally to one side of said card and at right angles from said perforated line 2 each of said perforated lines 3 being equidistant from one another and adapted to form a detachable tag or ticket 4. The outer ends of said tags or tickets are provided with V-shape cut-out portions 5 which extend on said perforated lines 3 in order to provide for the easy tearing of said tags 4. Each of said tags 4 are also provided with a central hole 6 adjacent its outer edge for tying the said tags to a bale of hay or straw by means of a cord, string or wire.

The other portion of the card which will be hereafter called the stub 7 is divided into a plurality of spaces 8 adapted to correspond with each of the tags 4.

The tags 4 and the spaces 8 are provided with a plurality of horizontal lines 9, 10, 11, 12, 13 and 14 suitably distanced from one another and vertical boundary lines 15 and 16. Intermediate of said lines 15 and 2 and 16 and 2 is provided a line which extends from horizontal line 10 to horizontal line 12 and intersects the horizontal line 11, and 18 are a plurality of dividing lines provided between the lines 9 and 10 and lines 13 and 14. Thus a plurality of spaces 19 will be formed between the lines 9 and 10 and 13 and 14 in which may be inserted the year, the name of each month of the year and the date. The division line 17 which intersects the line 11 forms four spaces 20, 21, 22 and 23. In the space 20 the license number of the presser or his name may be inserted. In the space 21 the serial number of the tag may be inserted. In the space 22, which is below the space 20 the number of the quality of the hay or straw may be inserted and in the space 23, which is below the space 21 the weight of the bale of straw or hay can be inserted. Below said spaces 22 and 23 and above the spaces 19 provided between the lines 13 and 14, is provided a transverse space 24 which is preferably bounded at each end by the lines 15 and 16 and divided by the perforated line 2. In this space 24 should be inserted the grade of the hay or straw.

Adjacent the line 15 is provided a space which extends adjacent the hole 6 and in said space can be inserted the name of a State or Province from where the bale of hay or straw comes from. On the stub portion 7 is also provided a space 25 bounded on one side by the vertical line 16 and on its other side by the vertical line 26, said space being preferably used for the insertion of the name of the State or Province to correspond with that on the detachable tag portion 4.

Suitably distanced from said line 26 and parallel thereto is provided a line 27 forming a vertical space which is divided by a plurality of lines 28 which preferably form a plurality of spaces 29 in which may be inserted the name of the locality, the name of the farmer, the total weight of hay or straw in the series, as well as the date. The said spaces 29 preferably extend the whole length of a stub and serve as a memorandum for the presser who keeps the stub portion.

It will thus readily be seen that the stub portion 7 is merely a duplicate of the detachable tag portion 4, with the supplementary information relative to the name of the farmer and the name of the locality which is of no use to the consumer. The detachable tag and the stub each bearing the date of pressing of the hay or straw is most essential, as the season's influence on the hay or straw is a well known fact. In case of discussion between the sellers and the buyers, the presser who pressed the bale can easily be traced through the number of his license or his name which may appear in the space provided on the tag or stub. It is claimed that a tag of this character will be of practically no additional cost to the farmers and will check dishonest means employed sometimes by the sellers or even the farmers when baling the hay or straw of inferior quality and classing it as of a better or higher quality, thus raising the hay trade to the same level as the grain business, as the delinquent or dishonest farmer or seller can be easily traced back and punished as the case may be.

There are different qualities of hay, and in order to save time in the selection of the bales of hay or straw or for the quick handling of the same for transportation, a coloured stripe may be provided across the tag and stub to indicate the quality, for instance: quality number 1 would be indicated by one coloured stripe 30; quality number 2 could be distinguished by two coloured stripes 31; and quality number 3 by three coloured stripes. These stripes should project across the ticket and preferably adjacent the perforated line 2 so that when the tag 4 is detached and secured to the bale the stripes will easily be seen when selection is made for the classification of the above qualities.

What I claim as my invention is:

1. A device of the character described comprising a strip of material divided by a line of perforations to constitute two major sections, one section forming a record card and the other section being subdivided to form a plurality of labels, said record card having designated spaces to receive data regarding a gross quantity of merchandise and the labels having designated spaces to receive data relating to separate smaller quantities of said gross quantity the sum of which substantially equals the gross quantity covered by the record card, the record card also having designated spaces associated with each label to receive data relating to the separate quantities substantially the same as the data received on the label.

2. A device defined in claim 1 having stripes on the face of the record card and on the face of the labels to indicate the quality of merchandise.

3. Means for identifying the origin of bales of hay, straw and the like comprising a sheet having designated spaces to receive the name of the farmer, the locality of the farm and the date of receipt of the shipment and the quantity of the same, said sheet being divided by lines of perforations into a main portion constituting a record card and a plurality of separable labels adapted for use with the individual bales of hay, straw and the like, each label having designated spaces to receive data indicating the weight of the bale when shipped, the date of shipment, and the quality, the record card bearing adjacent each label designed space substantially the duplicate of the designated spaces on the labels and a number corresponding to a number on the label.

Signed at Montreal, Quebec, Canada, this 23rd day of March, 1921.

G. des TROIS MAISONS.

Witnesses:
 C. PATENAUDE,
 A. P. DEAL.